(12) United States Patent
Hudis et al.

(10) Patent No.: US 6,208,502 B1
(45) Date of Patent: Mar. 27, 2001

(54) NON-SYMMETRIC CAPACITOR

(75) Inventors: Martin Hudis, Mattapoisett, MA (US); Robert Hutchinson, Dorset (GB); Nikola Marincic, Winchester, MA (US); Mulk Arora, Huntsville, AL (US)

(73) Assignee: Aerovox, Inc., New Bedford, MA (US)

( * ) Notice: Subject to any disclaimer, the term of this patent is extended or adjusted under 35 U.S.C. 154(b) by 0 days.

(21) Appl. No.: 09/110,223

(22) Filed: Jul. 6, 1998

(51) Int. Cl.$^7$ .................................................... H01G 9/00
(52) U.S. Cl. ........................................ 361/503; 361/502
(58) Field of Search ................................... 361/500, 502, 361/503, 504, 506, 508, 509, 510

(56) References Cited

U.S. PATENT DOCUMENTS

| | | | |
|---|---|---|---|
| 2,236,270 | 3/1941 | Katzman | 175/315 |
| 3,522,493 | 8/1970 | O'Mara et al. | 317/258 |
| 3,531,693 | 9/1970 | Buice | 317/230 |
| 3,628,103 | 12/1971 | Booe | 317/230 |
| 3,632,498 | 1/1972 | Beer | 204/290 |
| 3,675,087 | 7/1972 | Zykov et al. | 317/230 |
| 3,845,364 | 10/1974 | Shoot | 317/230 |
| 4,024,442 * | 5/1977 | Anderson | 361/322 |
| 4,184,192 | 1/1980 | Yoshida et al. | 361/433 |
| 4,244,010 | 1/1981 | Lintott | 361/433 |
| 4,245,275 | 1/1981 | Cannon | 361/433 |
| 4,376,713 * | 3/1983 | Dunkl | 252/62.2 |
| 4,408,259 | 10/1983 | Muranaka et al. | 361/434 |
| 4,480,290 | 10/1984 | Constanti et al. | 361/433 |
| 4,523,255 * | 6/1985 | Rogers | 361/433 |
| 4,766,522 | 8/1988 | McHardy et al. | 361/433 |
| 4,780,796 | 10/1988 | Fukuda et al. | 361/433 |
| 4,780,797 | 10/1988 | Libby | 361/433 |
| 4,803,596 | 2/1989 | Hellwig et al. | 361/525 |
| 4,888,666 * | 12/1989 | Naitoh et al. | 361/512 |
| 4,942,500 | 7/1990 | Libby et al. | 361/516 |
| 4,942,501 | 7/1990 | MacFarlane et al. | 361/523 |
| 4,992,910 | 2/1991 | Evans | 361/502 |
| 5,043,849 | 8/1991 | Libby | 361/516 |
| 5,098,485 | 3/1992 | Evans | 148/272 |

(List continued on next page.)

FOREIGN PATENT DOCUMENTS

| | | | |
|---|---|---|---|
| 0 078 404 A2 0 | 5/1983 | (EP) | H01M/14/00 |
| 5-13282 | 1/1993 | (JP) | H01G/9/04 |
| 5-6840 | 1/1993 | (JP) | H01G/9/04 |
| WO 94/22152 | 9/1994 | (WO) | H01G/9/00 |

OTHER PUBLICATIONS

"Basic Electric Circuit Analysis"; Johnson et al.; 1984; Prentice Hall Inc.; 172–175, 1984.*
"Properties and Performance of Hybrid Aluminum Electrolytic/Electrochemical Capacitors," Miller et al. Carts 96: 15th Cap. & Resistor Tech Sym., Mar. 11–15, 1996.
Web page at: http"//www.evanscap.com/Evanscap%20news%20Oct97.html, "Latest News!", Evans Cap. Co., May 6, 1998.

(List continued on next page.)

Primary Examiner—Kristine Kincaid
Assistant Examiner—Eric Thomas
(74) Attorney, Agent, or Firm—Fish & Richardson P.C.

(57) ABSTRACT

A capacitor having an electrochemical cathode electrode, an electrolytic anode electrode, and a substantially non-aqueous electrolyte disposed between the cathode and anode electrodes. The cathode includes a metal and a finely divided material, i.e. a conducting material with a very high ratio of surface area to volume. The anode includes an oxide forming metal and a corresponding metal oxide. The substantially non-aqueous electrolyte is in contact with the finely divided material forming a double layer electrochemical cathode capacitor. The cathode provides the foundation for interleaving a plurality of anodes with a plurality of cathodes. Insulating layers separate the interleaved anodes from the cathodes.

7 Claims, 12 Drawing Sheets

U.S. PATENT DOCUMENTS

| | | | | |
|---|---|---|---|---|
| 5,131,388 | * | 7/1992 | Pless et al. | 128/419 |
| 5,153,820 | * | 10/1992 | MacFarlane et al. | 361/525 |
| 5,230,712 | | 7/1993 | Matthews | 29/25.03 |
| 5,369,547 | | 11/1994 | Evans | 361/516 |
| 5,400,211 | | 3/1995 | Evans | 361/502 |
| 5,450,279 | | 9/1995 | Yoshida et al. | 361/502 |
| 5,464,453 | * | 11/1995 | Tong et al. | 29/26.03 |
| 5,469,325 | | 11/1995 | Evans | 361/526 |
| 5,492,604 | | 2/1996 | Ray | 205/373 |
| 5,549,989 | | 8/1996 | Anani | 429/193 |
| 5,552,245 | | 9/1996 | Li et al. | 429/188 |
| 5,559,667 | | 9/1996 | Evans | 361/526 |
| 5,568,353 | | 10/1996 | Bai et al. | 361/523 |
| 5,584,890 | * | 12/1996 | MacFarlane et al. | 29/25.03 |
| 5,585,999 | | 12/1996 | De Long et al. | 361/505 |
| 5,587,871 | | 12/1996 | Ue et al. | 361/504 |
| 5,600,535 | | 2/1997 | Jow et al. | 361/503 |
| 5,621,609 | | 4/1997 | Zheng et al. | 361/503 |
| 5,629,829 | * | 5/1997 | Ikeya | 361/505 |
| 5,649,982 | | 7/1997 | Halliop | 29/25.03 |
| 5,728,181 | | 3/1998 | Jung et al. | 29/623.5 |
| 5,737,181 | | 4/1998 | Evans | 361/504 |
| 5,754,394 | | 5/1998 | Evans | 361/516 |
| 5,786,980 | | 7/1998 | Evans | 361/502 |
| 5,851,506 | | 12/1998 | Zheng et al. | 423/592 |
| 5,920,455 | | 7/1999 | Shah et al. | 361/502 |
| 5,922,215 | | 7/1999 | Pless et al. | 216/6 |

OTHER PUBLICATIONS

Evans Capacitor Co., Technical Papers, "Forty Kilojoule Carbon Double Lyer Capacitor," Dec. 6, 1993, presented at the International Seminar on Double Layer Capacitors and Similar Engergy Storage Devices, David A. Evans.

Evans Capacitor Co., Technical Papers, "Performance of Mil–Type Hybrid Tantalum Capacitors," Evans et al. No Date.

Evans Capacitor Co., company brochure, "The Capattery" No Date.

"A 170 Volt Tantalum Hybrid™ Capacitor—Engineering Considerations," David A. Evans, Presented to the 7th Int. Seminar on Double Layer Capacitors and Similar Energy Storage Devices, Dec. 8–10, 1997, Florida.

Evans Capacitor Co., company brochure, "Hybrid Capacitor, Comparison of Hybrid and Aluminum Electrolytic Performance," Technical Data, Aug. 1998.

Evans Capacitor Co., company brochure, "Hybrid Capacitor, Polypropylene Case," Poly Case—Data Sheet Aug. 1998.

"Hermetic Hybrid Capacitors (and Other Goodies)," David A. Evans, Presented at the 6th Int. Seminar on Double Layer Capacitors and Similar Energy Storage Devices, Dec. 9, 1996, Florida.

"The Electrochemical Behavior of Ruthenium Oxide ($RuO_2$) as a Material for Electrochemical Capacitors" No Date.

"Counterelectrode Preparation for an Improved Tantalum Electrolytic Capacitor," Stuart E. Libby, Transitor Electronics, Inc., No Date.

"Transition Metal Oxide Electrochemical Capacitors," Raistrick et al., Proceedings of Electrochemical Society Symposium on Electroceramics, Honolulu, HI, Oct. 22, 1987, LA–UR 87–4190.

"Electrical Response of Electrochemical Capacitors Based on High Surface Area Ruthenium Oxide Electrodes," Raistrick et al., Electrochemical Society Proceedings, Los Alamos Nat'L Lab, Los Alamos, NM, LA–UR 87–2340.

"Electrochemical Capacitors," Ian D. Raistrick, MEE–11, Invited Ch. *Electrochemistry in Electronics*, To be Published by Noyes Publications, Jan. 21, 1990, Los Alamos, NM.

"The Littlest Big Capacitor—An Evans Hybrid," David A. Evans, Evans Company, Technical Papers, www.evanscap.com/isdlc5–2.html, E. Providence, RI. No Date.

"High Energy Denisty Electrolytic–Electrochemical Hybrid Capacitor," David A. Evans, Evans Co., Technical Papers, www.evanscap.com/carts14–2.html, E. Providence, RI. No Date.

Company brochure, Evans Capacitor Company, "Products," www.evanscap.com/ourprod.html, E. Providence, RI. No Date.

"High–Rate, Solid–State Electrochemical Capacitors," J.E. Oxley, Oxley Research, Inc., New Haven, CT, 1990.

"Electrochemical Capacitors," McHardy, American Inst. Of Aeronautics and Astronautics, Inc., 1987, pp. 306–308.

"KTI Hydros–Ruthenium Oxide Capacitors, A History and Comparative Anaylsis" No Date.

* cited by examiner

NON-SYMMETRIC CAPACITOR

BACKGROUND OF THE INVENTION

This invention relates to non-symmetric electrolytic/electrochemical capacitors.

A typical symmetric aluminum electrolytic capacitor (FIG. 1) includes an aluminum anode foil, an aluminum cathode foil, and a conductive liquid electrolyte, such as ethylene glycol. Ethylene glycol is a substantially non-aqueous electrolyte, i.e. it contains less than 3% of water. The liquid electrolyte is retained by a porous paper separator which acts as a spacer between the anode and cathode foils. The anode and cathode foils are connected to external terminals via aluminum tabs.

Figure 1:
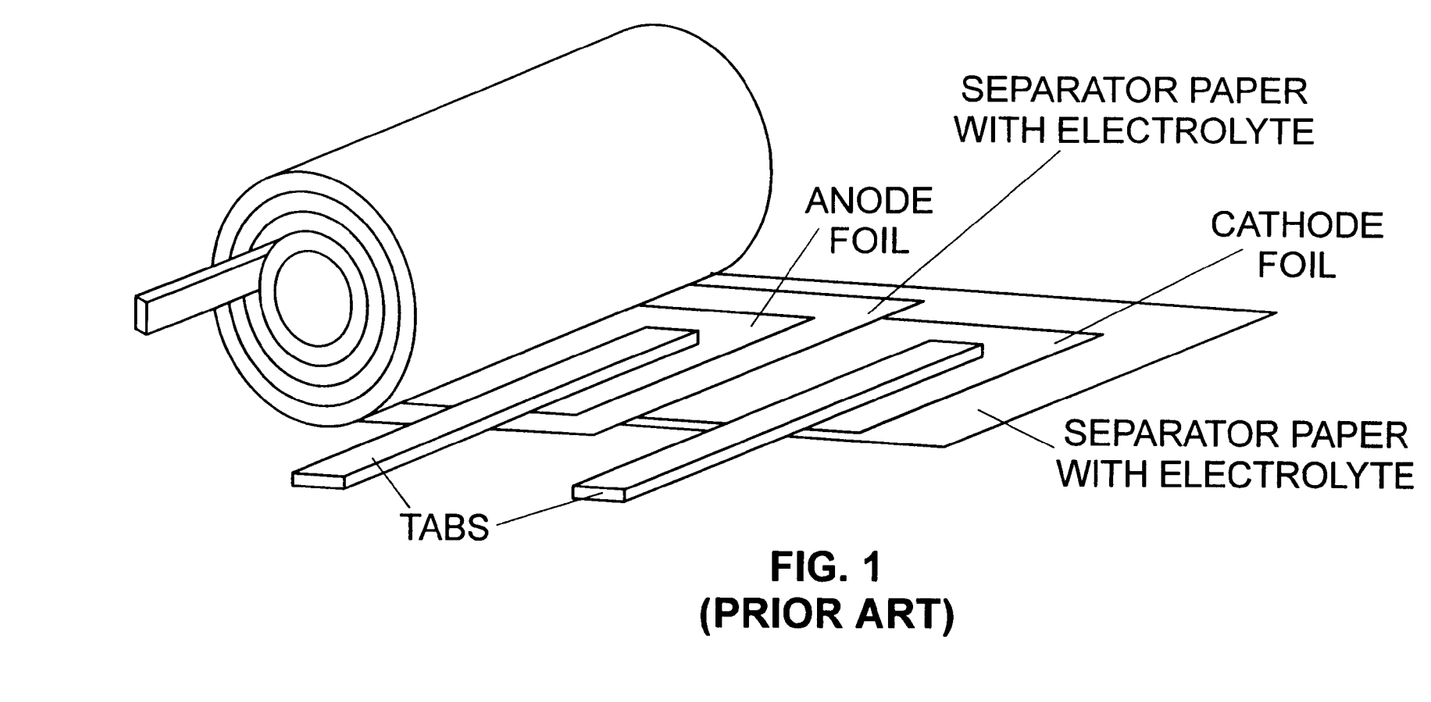
FIG. 1 is a cross-sectional view of a prior art symmetric aluminum electrolytic capacitor.

The surfaces of the aluminum anode and cathode foils are coated with a layer of an insulating aluminum oxide, which is formed by an electro-chemical oxidation process called forming. For the forming process, a constant voltage is applied to the aluminum foils. The formation voltage is higher than a typical rated working voltage of the capacitor. The aluminum oxide thickness is proportional to the applied voltage. In one example, an aluminum electrolytic capacitor may have rated working voltages up to 600 C and forming voltages in the range of 850 to 900 V.

Figure 1A:
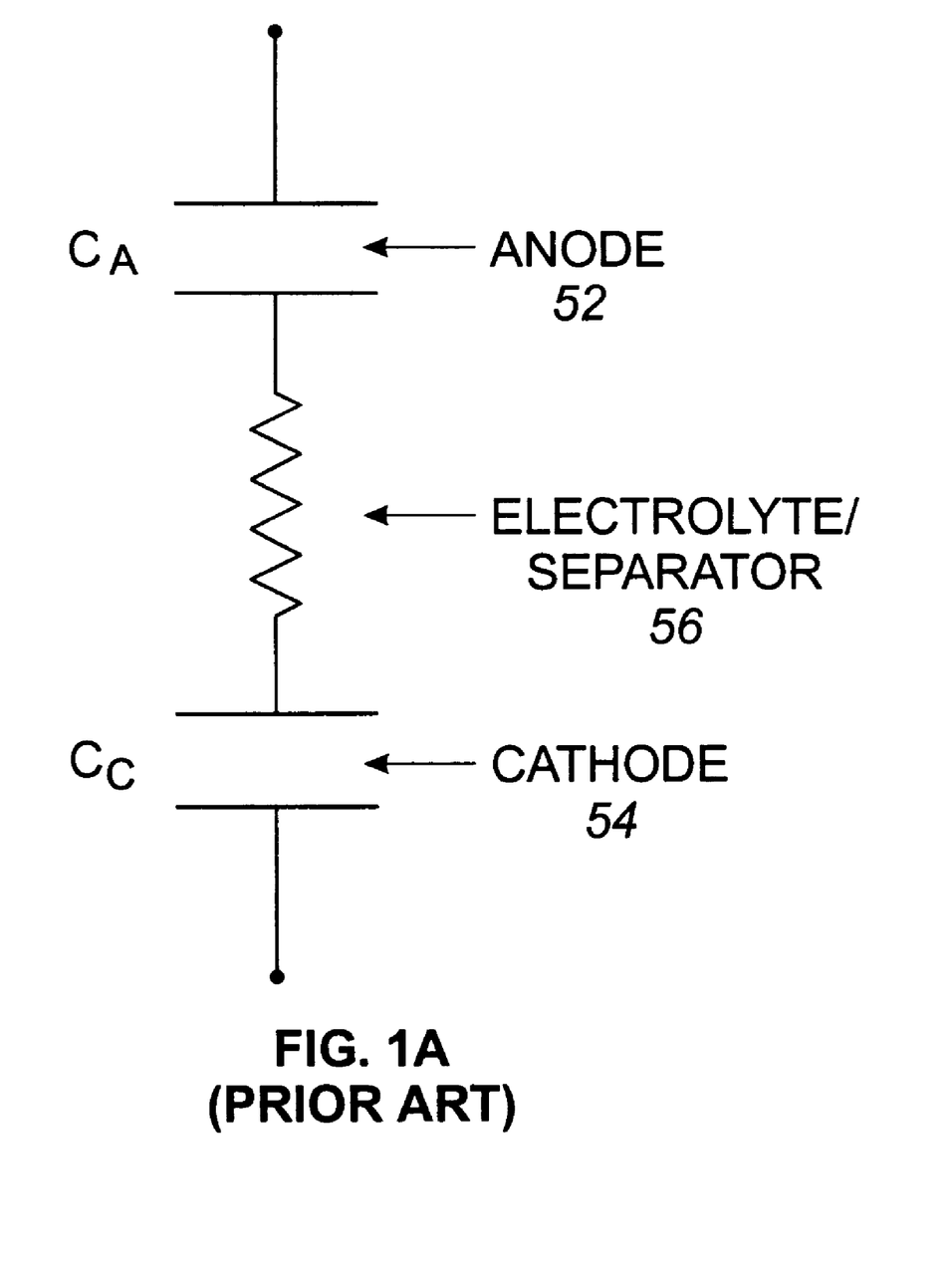
FIG. 1A is an equivalent circuit diagram of a prior art symmetric electrolytic capacitor.

The insulating aluminum oxide is in contact with the conductive electrolyte. The aluminum anode and cathode foils, the corresponding aluminum oxides, and the electrolyte with the separator form two capacitors connected in series (FIG. 1A). The thickness of the insulating aluminum oxide layer determines the breakdown voltage of the capacitor. By varying the aluminum oxide layer thickness, the specific capacitance (i.e., capacitance per surface area) of each capacitor is varied. Increasing the aluminum oxide layer thickness reduces the specific capacitance and increases the breakdown voltage of the capacitor. The specific capacitance may be increased by increasing the active surface area of the aluminum foil. The active surface area of the aluminum foil is increased by etching.

Another class of capacitors are the electrochemical capacitors. Electrochemical capacitors fall into two categories: Faradaic and double-layer. Double-layer capacitors rely solely on interfacial charge separation across a boundary between an electrolyte and a conducting surface or an insulating surface such as a metal oxide. The Faradaic capacitors are often referred to as pseudo-capacitors. Pseudo-capacitors have enhanced charge storage derived from charge transfer through a chemical reaction that takes place across the interface between an electrolyte and a conducting surface. The charge transfer can occur, for example by: (1) surface charge attachment to a metal hydride like ruthenium hydride, (2) volume charge diffusion into a metal like silver coated palladium, or (3) an oxidation/reduction reaction at the surface of an oxide like ruthenium oxide.

Non-symmetric electrolytic/electrochemical capacitors use a conventional electrolytic capacitor at the anode and an electrochemical capacitor at the cathode. Evans U.S. Pat. No. 5,737,181 describes a non-symmetric capacitor that has a pseudo-capacitor ruthenium oxide ceramic cathode, a tantalum anode and an aqueous electrolyte. Non-symmetric capacitors with modified metal cathode surfaces are disclosed in Libby U.S. Pat. No. 4,780,797 and Rogers U.S. Pat. No. 4,523,255, which describe very aggressive aqueous electrolytes (e.g., sulfuric acid) that have high conductivity and are compatible with tantalum and tantalum oxide anodes.

SUMMARY OF THE INVENTION

In one aspect, the invention features a capacitor having an electrochemical cathode, an electrolytic anode and a substantially non-aqueous electrolyte disposed between the cathode and anode. The cathode includes a metal and a finely divided material, the anode includes an oxide forming metal and a corresponding metal oxide, and the substantially non-aqueous electrolyte is in contact with the finely divided material and the metal oxide. The cathode structure results in high capacitance, permitting much higher energy density.

In preferred implementations of the invention, one or more of the following features may be incorporated. The cathode may be a metal selected from the group consisting of nickel, titanium, platinum, other noble metals, other non-oxidizing metals and metals forming a conducting or semiconducting oxide. The cathode may also be an expanded nickel mesh. The anode may be aluminum coated with aluminum oxide. The anode may also be a metal selected from the group consisting of tantalum, niobium, zirconium, titanium, and alloys thereof. The finely divided material may be selected from the group consisting of activated carbon powder, carbon fibers, and graphite. The substantially non-aqueous electrolyte may be an ethylene glycol solvent mixture with additives, or a butyrolactone solvent mixtures with additives.

In another aspect the invention features a capacitor having a plurality of electrochemical cathodes, a plurality of electrolytic anodes interleaved with the electrochemical cathodes, and the plurality of anodes and cathodes form a plurality of parallel connected capacitors. A plurality of separators separate the cathodes from the anodes, and an electrolyte may be disposed between the cathodes and anodes. A cathode lead electrically connects the cathodes to each other and to a cathode terminal. An anode lead electrically connects the anodes to each other and to an anode terminal.

In preferred implementations of the invention, the anode may be formed as a stack of individual metal sheets, and the individual metal sheets may be connected to each other by a collector strip.

In another aspect the invention features an AC start capacitor having a first electrolytic anode, a second electrolytic anode, a floating electrochemical cathode interleaved between the first and second electrolytic anodes, and a non aqueous electrolyte. The first and second electrolytic anodes include a metal and a corresponding metal oxide, and the electrochemical cathode includes a metal having top and bottom surfaces coated with a finely divided material. An AC voltage is connected to the first and second electrolytic anodes.

In another aspect the invention features forming a capacitor by fabricating a plurality of anodes, fabricating a plurality of cathodes, and then interleaving the anodes and cathodes while separating them with insulating separators. The anodes and cathodes are then connected in parallel to each other. The anodes are fabricated by transporting a continuous sheet of a first metal, cutting pieces of the first metal sheet at spaced intervals, stacking the pieces of the first metal, and welding the stacked pieces of the first metal. The cathodes are fabricated by transporting a continuous sheet of a second metal, and cutting pieces of the second metal.

Among the advantages of the invention are that the non-symmetric capacitors can be used in high voltage applications without a series construction. They have increased energy density over conventional electrolytic capacitors, improved service life, reduced time constant, and increased power density over serially connected chemical capacitors.

Other features and advantages of the invention will be apparent from the following description of preferred embodiments, and from the claims.

DESCRIPTION OF THE PREFERRED EMBODIMENTS

Figure 2:
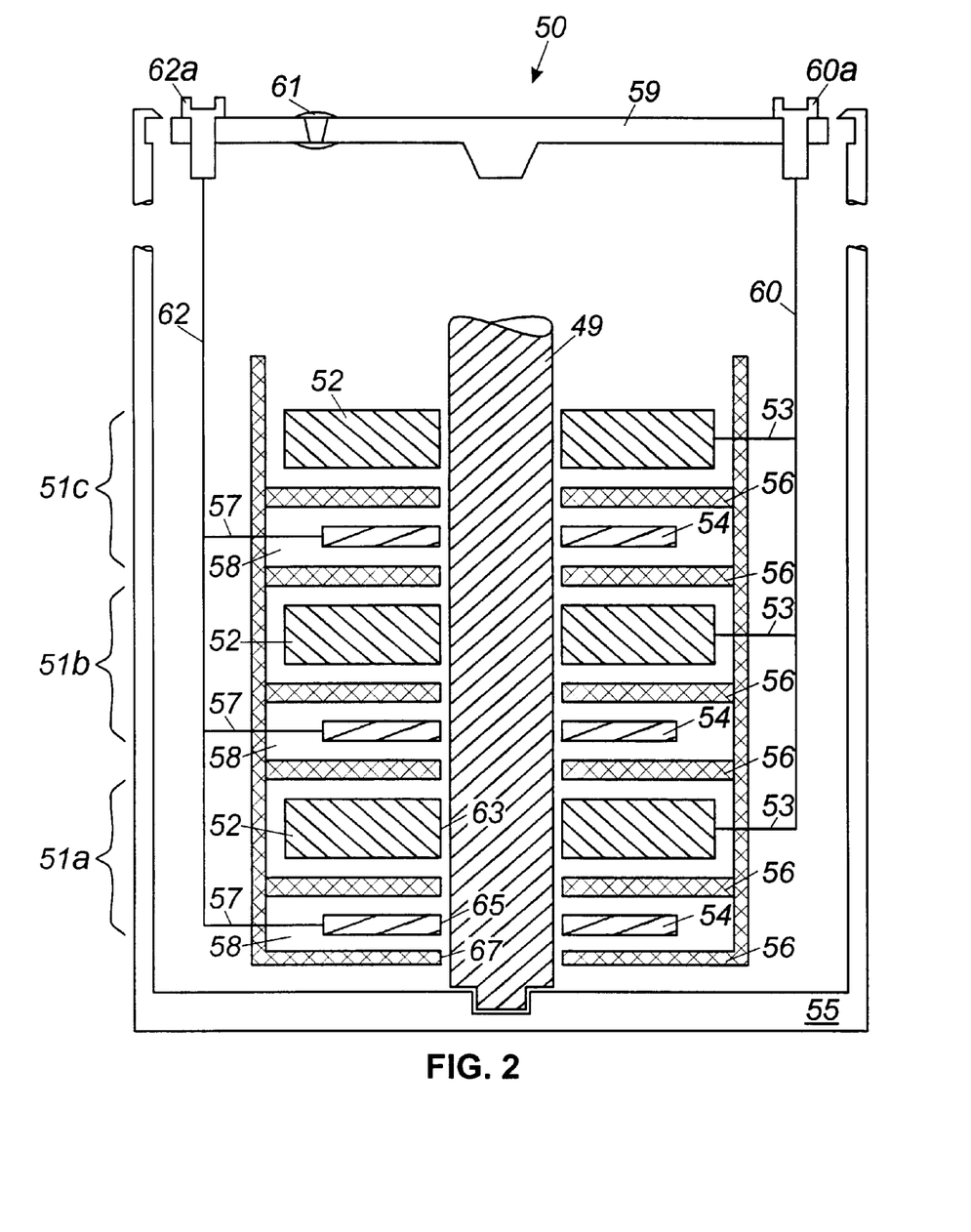
FIG. 2 is a cross-sectional view of a non-symmetric electrolytic/electrochemical capacitor embodiment of the invention.

Referring to FIG. 2, a multi-section non-symmetric capacitor 50 includes capacitor sections 51a to 51c. Although only three sections are shown for purposes of illustration, a typical embodiment may have more sections (e.g., 5 to 50, or many more). Each capacitor section 51a includes an anode 52, a cathode 54, an electrolyte 58 (liquid that impregnates the capacitor or partially fills the interior of container 55), and separator disks 56. In one example, the anodes 52, cathodes 54, and the separator disks 56 have annular shapes with central openings 63, 65, and 67, respectively. The anodes 52 are interleaved with the cathodes 54, and the individual capacitor sections are stacked so that a sequence of cathode/anode/cathode/anode is formed. The separator disks 56 separate the cathodes 54 from the anodes 52 within a capacitor section, and from the anodes in the adjacent capacitor section. The stacked sections 51a, 51b, and 51c are supported by a plastic support member 49, which is fed through the central openings 63, 65 and 67. The section assembly is placed in a plastic container or other suitable container, such as an aluminum case 55 which is closed on the top with a cover 59. The cover has a vent 61 and anode and cathode voltage terminals 60a, 62a. The vent is configured to open when the pressure inside the capacitor exceeds a certain value, e.g., 75 psi.

Figure 3:
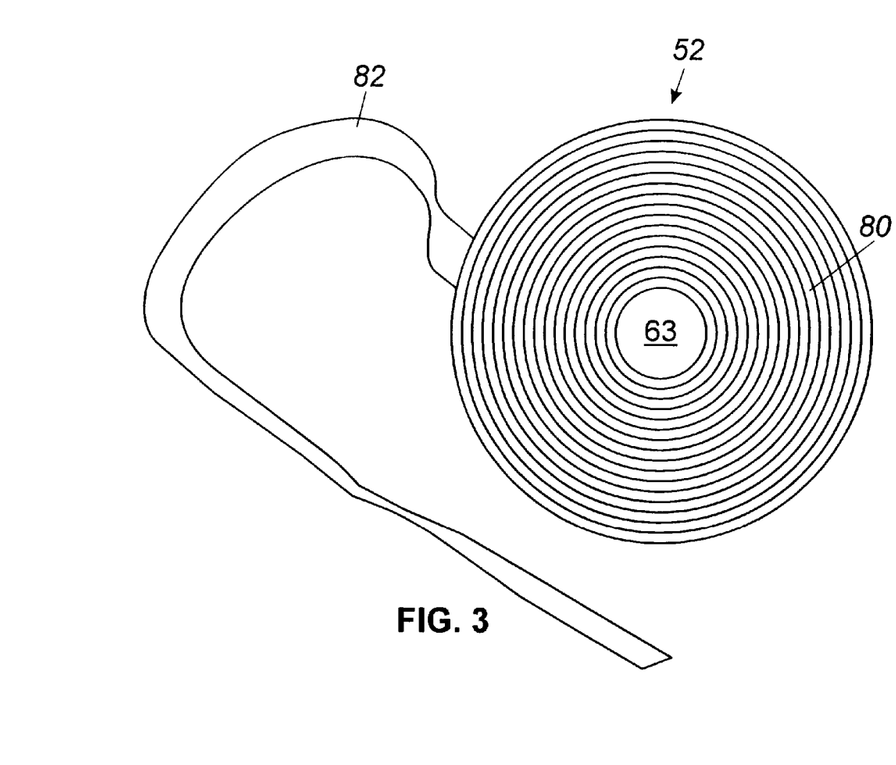
FIG. 3 is a perspective view of an anode roll useful in some embodiments of the invention.
Figure 4:
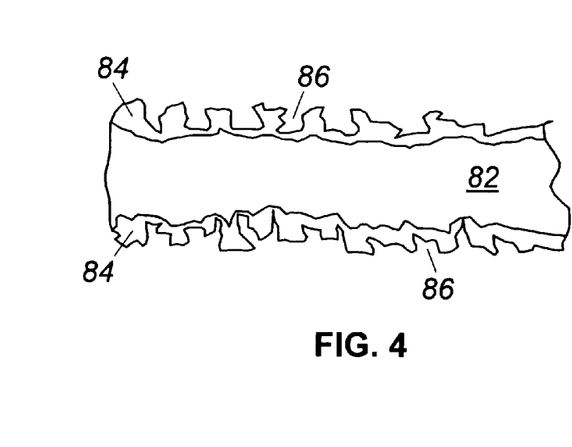
FIG. 4 is a cross-sectional view of a thin etched aluminum foil.

The anodes 52 are formed by winding etched and formed aluminum foil 82 into a wide roll (in one example the width may be in the range between 50 to 100 cm) and then slitting the wide roll to form a plurality of narrow rolls 80 (FIG. 3). Conventional processes may be used to etch the aluminum foil and form the aluminum oxide layer 84 (shown diagrammatically in FIG. 4). The etching process produces micron size holes 86 in the foil. The holes increase the effective surface area of the anode. In one example, the aluminum foil is 6 mm wide, and has a thickness of 100 micrometers. The etched aluminum holes 86 with the aluminum oxide layer 84 may be approximately 40 micrometers deep on both surfaces. The anode may also be fabricated by winding a flattened small diameter etched aluminum wire into a roll. The aluminum oxide layer is subsequently formed.

The insulating aluminum oxide surface of the anode contacts the electrolyte 58, to form an anode capacitor consisting of conductive aluminum/insulating aluminum oxide/conductive electrolyte.

Figure 5:
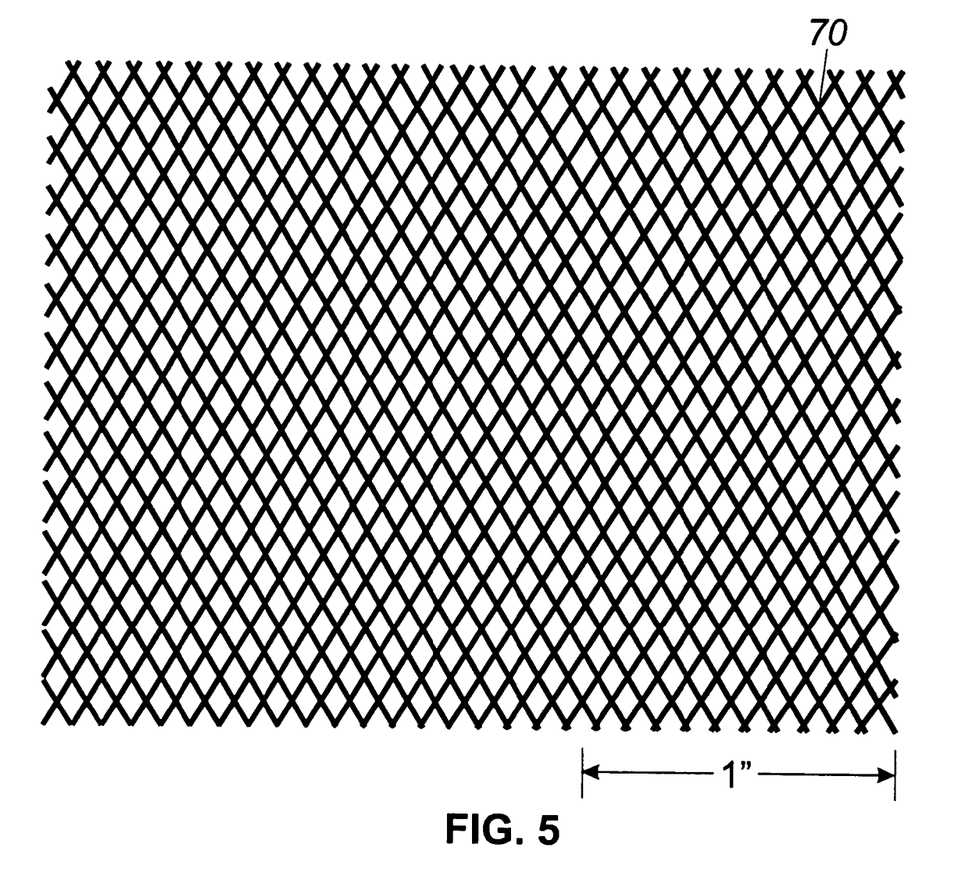
FIG. 5 is a perspective view of an expanded nickel mesh, used in the cathode of an embodiment of the invention.
Figure 6:
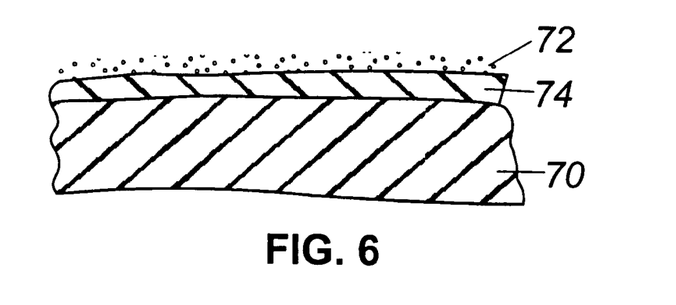
FIG. 6 is a perspective view of the expanded nickel mesh coated with carbon powder, used in the cathode of an embodiment of the invention.

The cathode 54 is formed by coating a nickel mesh 70 (FIG. 5) with a finely divided material, such as carbon powder 72 (FIG. 6). A finely divided material is a conducting material or any material which supports Faradaic charge transfer at an interface with an electrolyte and has a very high ratio of surface area to volume. The surface of the nickel mesh is coated with a layer of a non-insulating nickel oxide 74. The carbon powder 72 provides the interface with the electrolyte which functions as a double layer electrochemical capacitor. The nickel and the non-insulating nickel oxide layer function as a current collecting conductor. In one example, the thickness of the cathode is in the range between 0.003 to 0.004 inch, and the nickel mesh has 9000 holes per square inch.

Other materials may be used for the cathode current collector. They include materials that do not oxidize, such as noble metals platinum or palladium, or materials which form a conducting or a semiconducting oxide, such as nickel and titanium.

A non-insulating oxide forming current collector is desired because if a thin insulating oxide layer develops between the high gain cathode capacitor and the current collector, it will contribute to the formation of an additional capacitor. The additional capacitor will be formed between the conductive current collector/insulating oxide/conductive carbon powder. This additional capacitor will be connected in series with the double layer cathode capacitor. When two capacitors are connected in series the capacitor with the smallest capacitance (in this case the additional capacitor)

dominates and the benefit of the increased energy density of the double layer capacitor with the large capacitance diminishes.

The finely divided material, which together with the electrolyte forms the double layer capacitor, may be carbon powder, carbon fibers, graphite, platinum powder, ceramic oxide powder, such as ruthenium oxide, or mixtures of these powder materials.

The electrolyte 58 is a conducting liquid using either gamma-butyrolactone or ethylene glycol as the major solvent. The gamma-butyrolactone is a substantially non-aqueous solvent, using an aromatic dicarboxylic acid/organic base as the major ionogen for conductivity. A cosolvent, such as methoscypropiomitrile, is added in concentrations up to 15% to modify low temperature characteristics. Specific depolarizers, such as benzyl, are added to reduce gassing, and organic phosphates to improve the oxide stability.

The ethylene glycol system is also a substantially non-aqueous electrolyte, and uses aliphatic dicarboxylic acids/ammonia as ionogens. A water content of 1.5 to 2.5% improves the oxide formation capability during aging and low temperature characteristics. Specific depolarizers, such as p-nitrobenzoic acid are added to reduce gassing, and organic phosphates to improve the oxide stability.

These electrolyte mixtures have very attractive properties for the aluminum anode. These include ability to form an insulating oxide layer through aging on the cut anode surfaces, long shelf life, ability to withstand high surge voltages, both low and high temperature performance with a small temperature coefficient, strong gas absorption properties to provide long service life, and ability to work with low cost separators. The electrolyte mixtures also provide very high cathode gain for carbon coated nickel or titanium current collectors, even though they are non-aqueous and have a near neutral ph.

Referring again to FIG. 2, the capacitor sections 51a to 51c are connected in parallel to each other. The aluminum anodes 52 have metal tabs 53, which are ultrasonically welded to an anode lead 60. The anode lead 60 may be aluminum or other inert high conductivity metal, such as nickel or platinum, to prevent chloride contamination within the capacitor. Similarly, the cathodes 54 have ultrasonically welded metal tabs 57. The metal tabs 57 are ultrasonically welded to a cathode lead 62. The cathode lead 62 may be aluminum for a nickel based cathode or nickel for a titanium based cathode. The anode and cathode leads 60 and 62 are connected to the voltage terminals 60a and 62a, respectively, located on the top cover 59.

The separator disks 56 may be constructed from standard duplex or plain kraft paper or similar materials like Manila or Hemp (e.g., 50–200 micrometers thick). Other separator materials which can be used with the butyrolactone electrolyte mixtures and the ethylene glycol electrolyte mixtures include Kraft, manila or hemp fibers, or composites made from other paper separators and polypropylene fibers.

The much higher capacitance of the cathode compared to the anode allows the cathode to have a much smaller surface area, e.g., 0.2% to 2% of the area of the anode.

Figure 7:
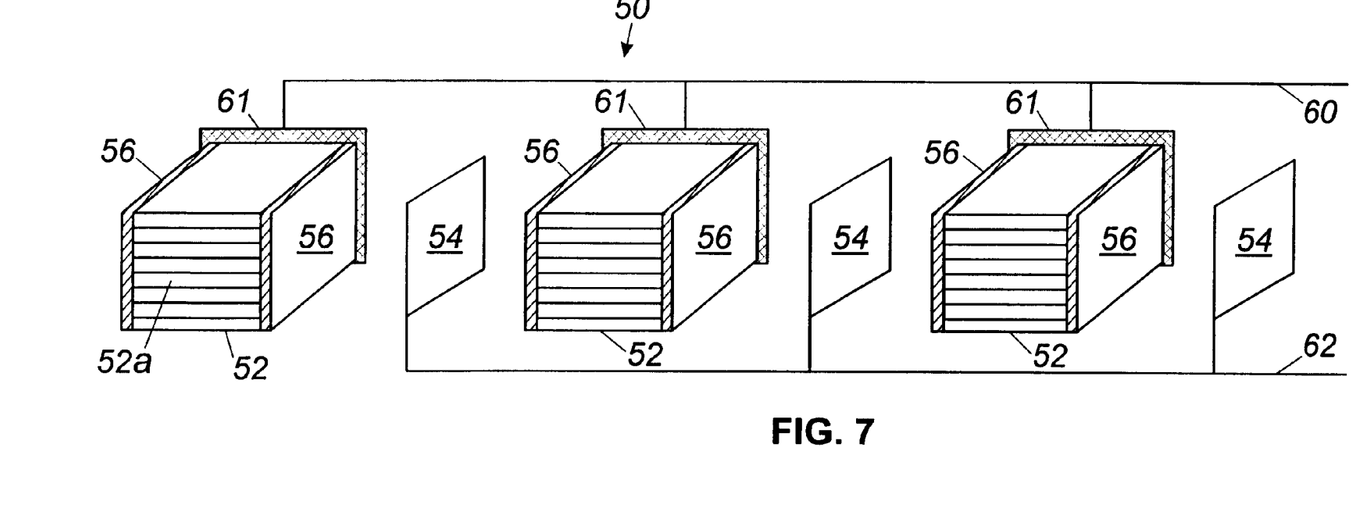
FIG. 7 is a diagrammatic view of a multi-cell non-symmetric electrolytic/electrochemical capacitor, according to another embodiment of the invention.

FIG. 7 shows an alternative multi-section capacitor 50, which includes cathodes 54, separators 56, collector plates 61, and cubic anodes 52, which are formed as stacks of etched and formed aluminum sheets 52a. The aluminum sheets 52a have a rectangular shape. The cubic anodes 52 can be built in a progressive cut-to-length line with two degrees of freedom. The stacked, etched, and formed aluminum sheets 52a are spot welded using a laser dot matrix pattern or ultrasonic welding. Other geometric configurations for the anode sheets are possible, including oval, and circular.

The anode material is not limited to pre-etched and formed aluminum. The block can be formed from thin very pure, soft or hard aluminum foil which is etched before welding and formed after it has been welded into a cubic geometry.

The cathodes 54 are shown as sheets of material that are interleaved between separators 56 and anodes 52.

The collector plates 61 are non-etched aluminum strips which are spot welded to the ends of the individual aluminum sheets 52a.

This construction further reduces the series resistance and provides an attachment point for the anode lead 60, which can be spot-welded to each of the individual anode collector plates 61. This construction puts all the individual anode sheets 52a in parallel and leads to a further reduction in the series resistance.

This multi-section capacitor 50 with anodes constructed from stacked aluminum sheets may be assembled using automated assembly equipment fed from two spools of material. One spool provides the cathode material which may be a soft nickel expanded mesh (or titanium mesh) coated on both sides with carbon particles. The second spool provides the anode material which may be a spool of very narrow slit etched and formed aluminum.

The butyrolactone and ethylene glycol electrolyte systems are compatible with various polymeric materials (e.g., nylon and polypropylene), thus adding to the low cost packaging options that can be obtained through this approach. This total package has the advantages of providing a very economical capacitor, using a set of materials that have a long field history under electrochemical conditions within a broad temperature range, and providing the basis for a new capacitor with the same long service life under electrochemical conditions.

Figure 8:
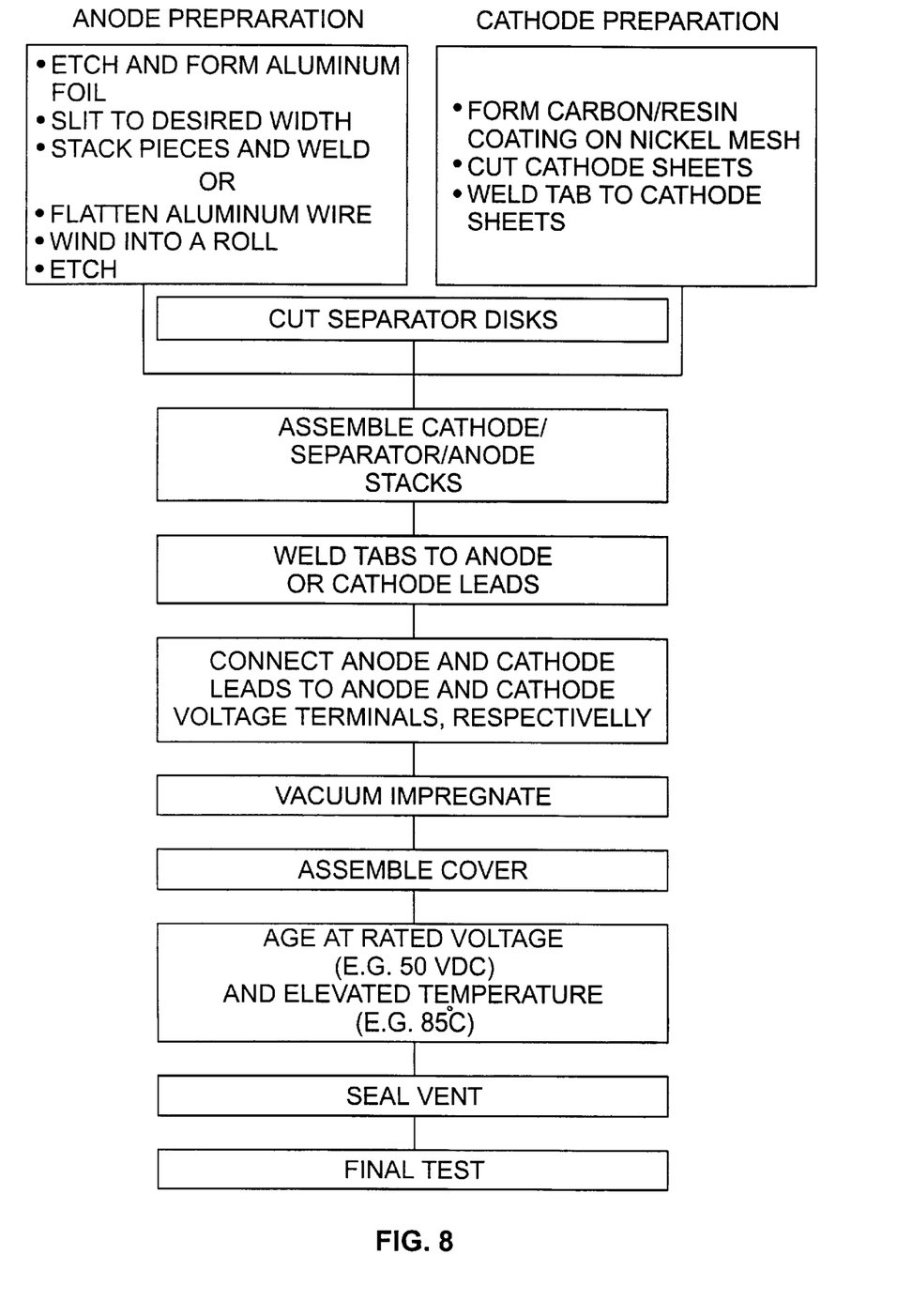
FIG. 8 is a flow chart of the process for fabricating a capacitor according to the invention.
Figure 9A:
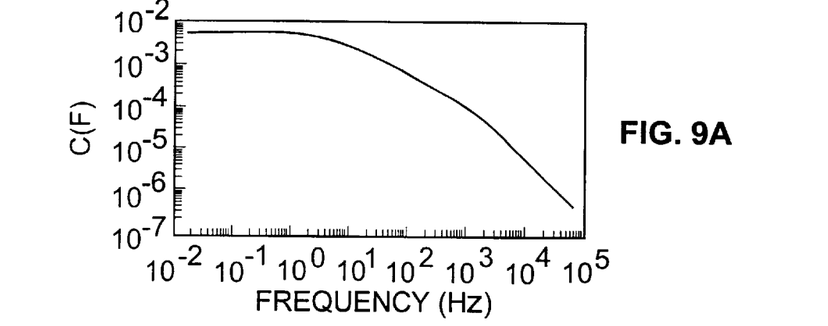
FIGS. 9A to 9D show impedance spectroscopy data for embodiments of the invention with a carbon coated nickel cathode, etched and formed aluminum anode and non-aqueous electrolyte.
Figure 9B:
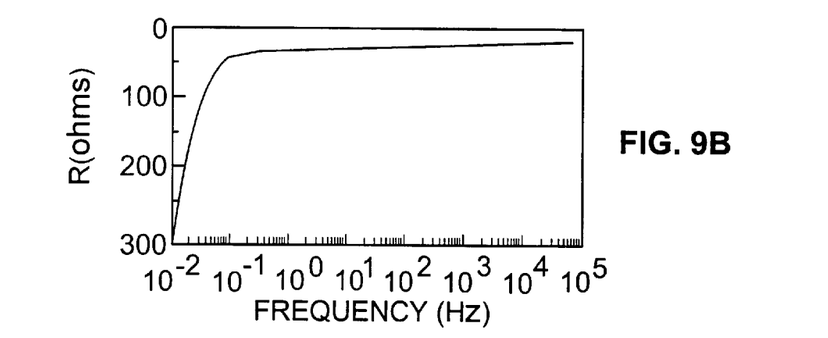
Figure 9C:
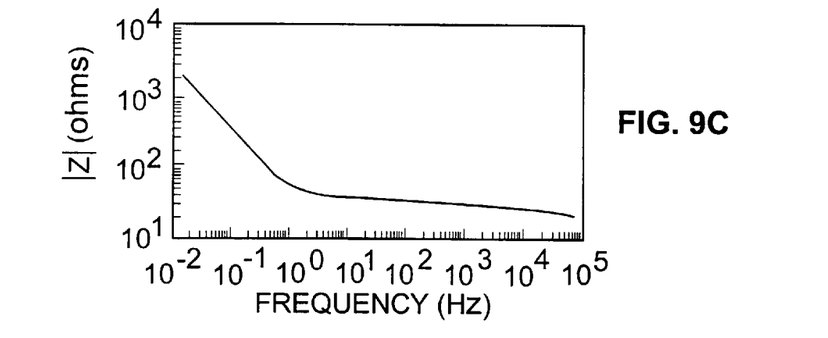
Figure 9D:
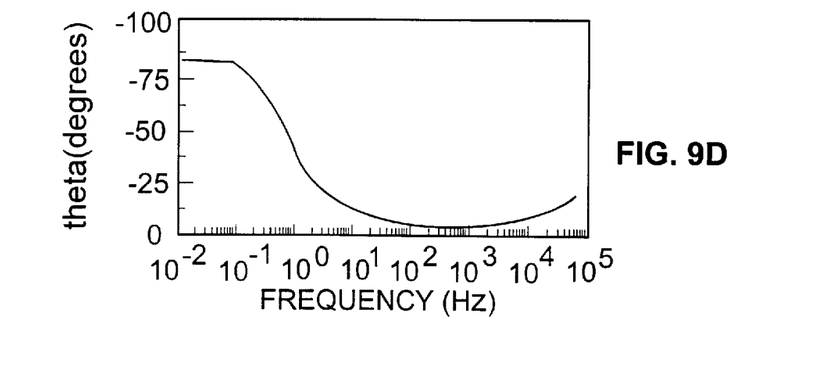
Figure 10A:
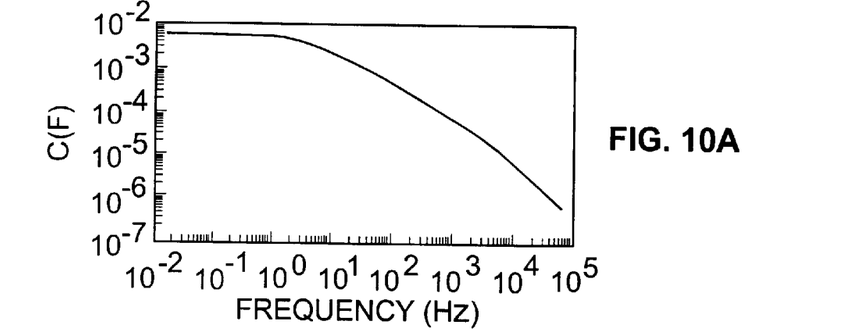
FIGS. 10A to 10D show impedance spectroscopy data for embodiments of the invention with a ruthenium oxide coated titanium cathode, etched and formed aluminum anode and non-aqueous electrolyte.
Figure 10B:
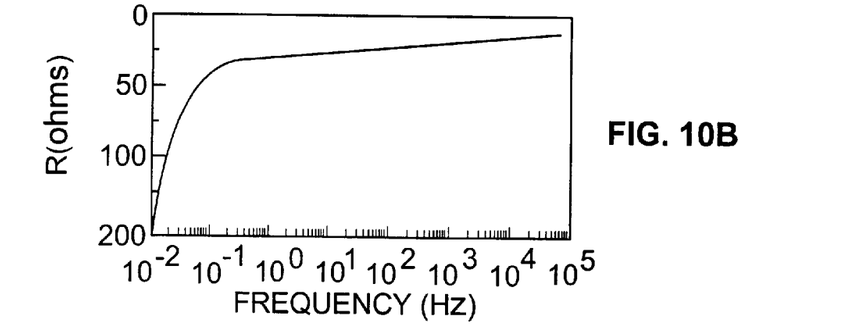
Figure 10C:
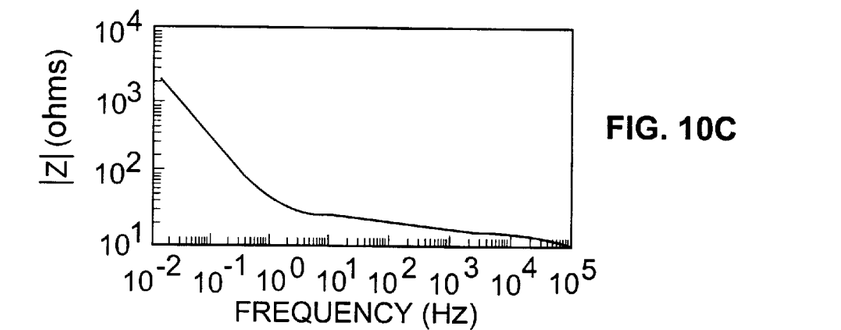
Figure 10D:
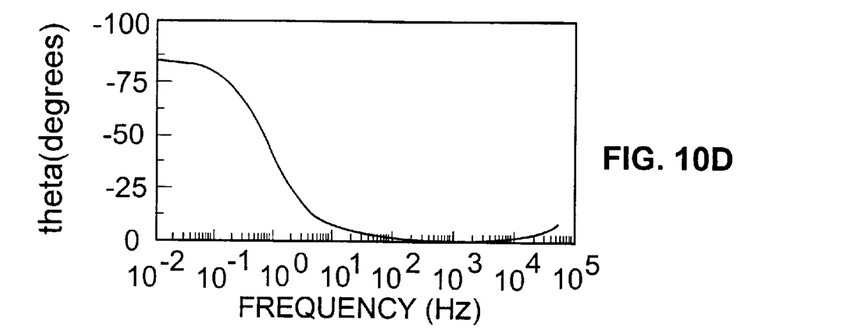
Figure 11A:
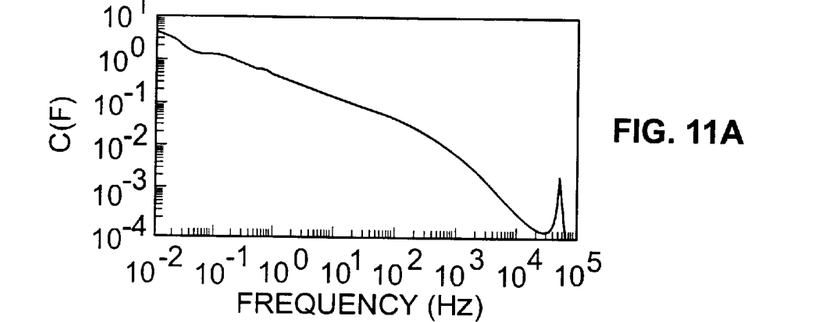
FIGS. 11A to 11D show impedance spectroscopy data for embodiments of the invention with carbon coated nickel electrodes (anode and cathode) and with butyrolactone based electrolyte.
Figure 11B:
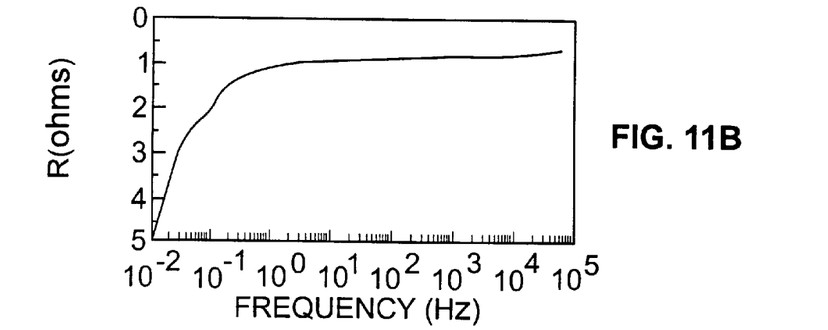
Figure 11C:
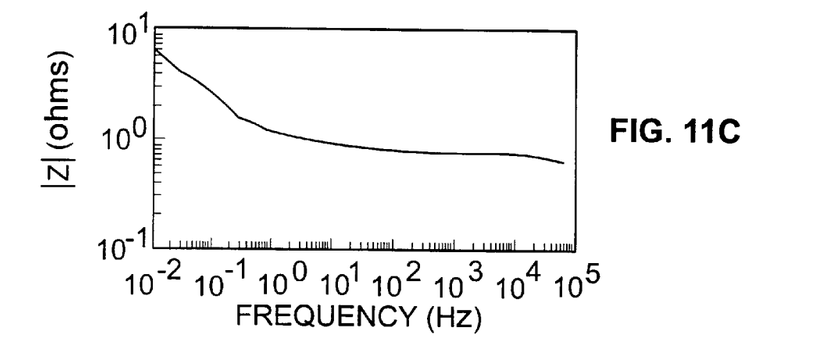
Figure 11D:
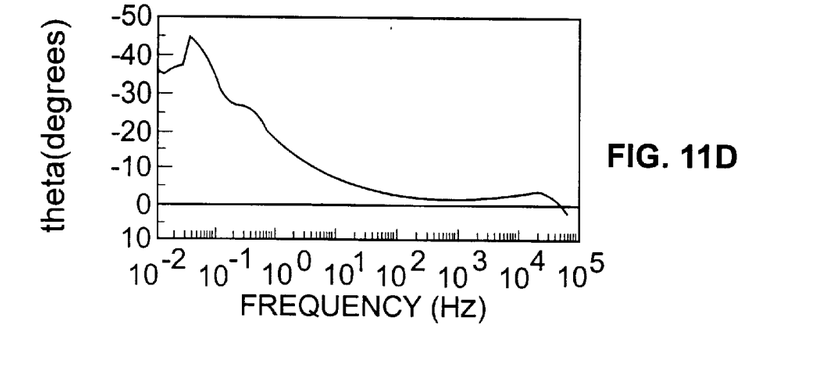
Figure 12A:
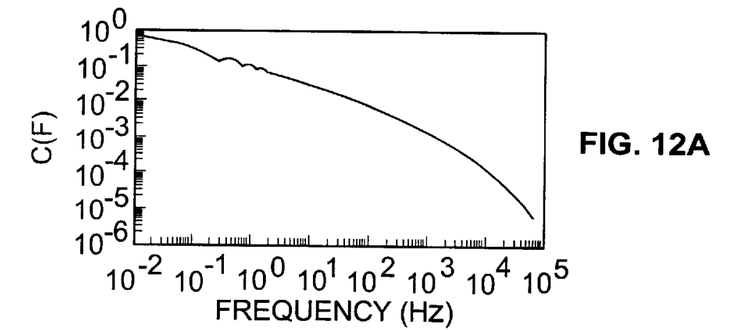
FIGS. 12A to 12D show impedance spectroscopy data for embodiments of the invention with carbon coated nickel electrodes (anode and cathode) and with ethylene glycol based electrolyte.
Figure 12B:
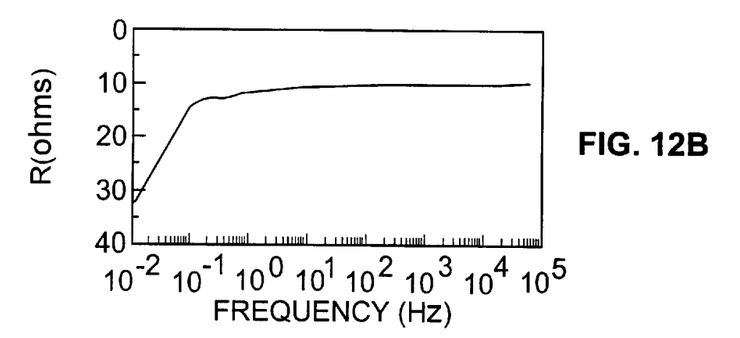
Figure 12C:
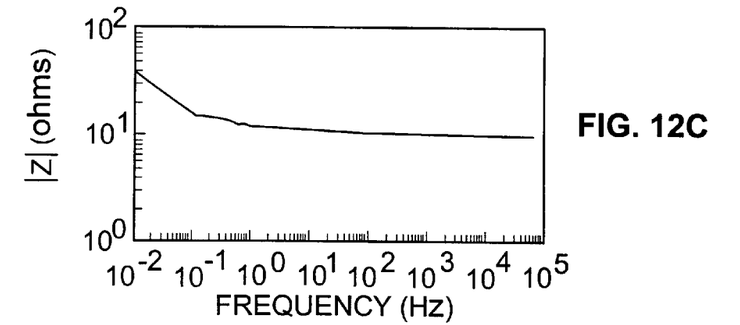
Figure 12D:
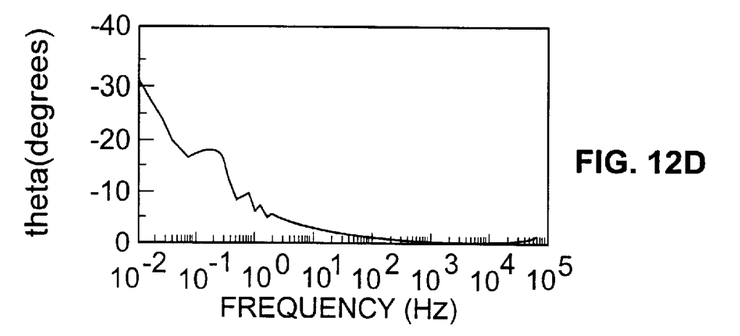

Referring to FIG. 8, the process of making capacitors according to the invention includes the following steps: First, the anodes and cathodes are fabricated, and the separator disks are cut. The anodes, separators, and cathodes are then interleaved to form a stack. Anode and cathode tabs are ultrasonically welded to the anode and cathode leads, respectively, and the stack assembly is placed into a container. The anode and cathode leads are then connected to anode and cathode voltage terminals, respectively, located on the container cover. The stack assembly is vacuum impregnated with a substantially non-aqueous electrolyte. The container is closed with the cover, additional electrolyte may be added, and the capacitor is aged at a rated voltage (e.g., 50 V DC) and elevated temperature (e.g., 85° C.). Finally, the vent is sealed, and the capacitor performance is evaluated by bridge measurements and DC leakage current measurements at rated voltage.

FIGS. 9A to 9D show the impedance spectroscopy of a non-symmetrical capacitor constructed with a cathode made of carbon coated nickel expanded mesh. FIGS. 10A to 10D show the impedance spectroscopy of a non-symmetrical capacitor constructed with a cathode made of ruthenium oxide coated titanium expanded mesh. In both cases, the anode is constructed from etched aluminum foil. The electrolyte is a butyrolactone system.

FIGS. 9A to 9D and 10A to 10D show plots of capacitance (9A, 10A), resistance (9B, 10B), impedance (9C, 10C), and phase angle (9D, 10D) versus frequency. These data demonstrate capacitor performance limited by the capacitance of the anode for frequencies that are less than 1 Hz for this specific design. The frequency limit may be changed by adjusting the design parameters of the capacitor, for example the carbon coating thickness and anode geometry.

The measurements in FIGS. 11A to 11D and 12A to 12D, show the performance of symmetrical capacitors having carbon coated nickel screen electrodes. In FIGS. 11A to 11D, the electrolyte is butyrolactone based and in FIGS. 12A to 12D, the electrolyte is ethylene glycol based. The curves demonstrate capacitive performance with both electrolyte systems.

One of the advantages of this non-symmetric capacitor is that it can be used for high voltage application without series construction. Conventional electrochemical capacitors are limited to low voltages (e.g., less than or equal to 4.5 V). Higher voltage capacitor ratings using electrochemical capacitor technology require series construction. Series construction of electrochemical capacitors leads to voltage sharing problems, high series resistance, and sealing problems (the individual series section must be isolated electrically).

Since the invention uses an aluminum electrolytic anode, voltages as high as 600 V DC can be applied to the anode. Most of the applied voltage can be placed on the anode, by choosing the anode capacitance to be a small fraction of the cathode capacitance. The interleaving construction leads to anode sections, that are operated in parallel, not in series. This eliminates the voltage sharing problems, leads to a much lower series resistance, and eliminates the sealing problems.

The lower series resistance is important for high current pulsing applications and continuous ripple current applications. Low series resistance directly relates to an increase in the peak current, that can be pulsed through the capacitor. Low series resistance also relates to a lower power factor for continuous ripple current applications.

Another advantage of the invention is increased energy density for the non-symmetric capacitor. The ability to operate with a very limited amount of cathode material leaves more room within the same size case for anode material. This leads to an increase in the energy stored in the capacitor by a factor of 2 to 3 over conventional electrolytic capacitors.

A further advantage comes from possible construction differences. Conventional aluminum electrolytic capacitors require etched foils, which must have some mechanical strength and flexibility so they can be formed and wound on a high-speed automatic forming and winding machine. This limits the etching and therefore the specific capacitance of the anode foil and, in turn, the amount of stored energy. With the new construction, a small diameter very pure, soft or hard aluminum wire (e.g., 150 micrometers) can be flattened and wound into the interleaving anode structures before it is etched and formed. With the etching and forming being done after the anode is wound, etching is not limited by the mechanical properties of the aluminum material and the anode capacitance can be increased by 50%.

Another advantage of the invention is improved service life. In DC applications of conventional aluminum electrolytic capacitors, the leakage current and gassing of the aluminum foils (primarily at the cathode) can limit the life of the capacitor by forming internal gas pressure which vents and sets the life of the capacitor. With the carbon coated nickel cathode, hydrogen gassing is reduced resulting in reduced chemical activity and considerably extended life for the capacitor.

Another advantage of the invention is improved time constant. Electrochemical capacitors are inherently slow devices (long time constant) because of the high contact resistance across the large porous active surface area of the electrodes. The thick porous oxide layer provides a long conducting path and many conducting interfaces, which lead to a very high resistance. The thickness of the cathode layer is designed so that the cathode capacitance provides the correct voltage across the anode. By substituting the thick porous layer with a carbon powder coating the thickness of the cathode is reduced. This causes a reduction in the time constant. Shorter time constant can also be obtained by selecting the aspect ratio (surface area to volume ratio) of the specific carbon particles used in the coating on the nickel (or titanium) wire.

Another key design variable with the interleaving construction is the thickness of the anode; the smaller the anode thickness the shorter the time constant. By using a narrow anode foil width (or a small diameter flattened wire), the time constant can be decreased to 5 milliseconds. This is still too slow for high ripple current computer grade applications, but it is suitable for high CV (capacitance and voltage) low ripple current computer grade applications. In addition to the reduced time constant, the capacitor has less than half the size and half the cost of an electrolytic capacitor.

The interleaving construction provides also the basis for a new approach to start (AC) electrolytic capacitors. Start (AC) electrolytic capacitors operate for a relatively short period of time and have a power factor between 2.5 to 6.5%. Conventional electrochemical capacitors have a power factor higher than 10% at line frequency and therefore are not suitable for AC start capacitor applications.

Figure 13A:
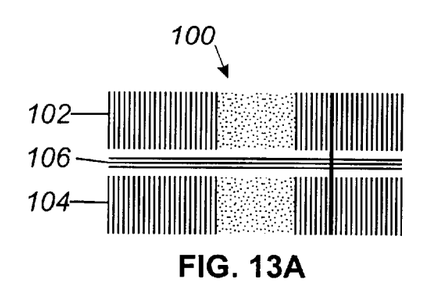
FIG. 13A is a diagrammatic view of a double anode structure for an AC start capacitor.
Figure 13B:
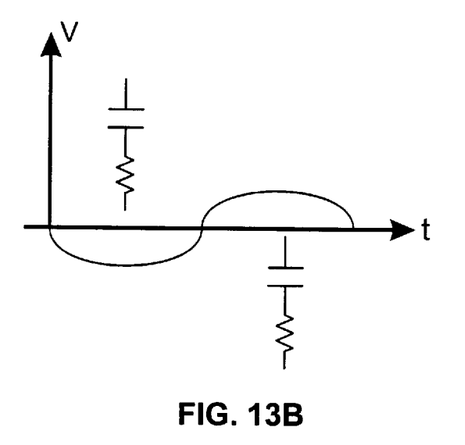
FIG. 13B is a plot of the applied AC voltage across the double anode structure of FIG. 13A.

Referring to FIG. 13A, a typical double layer structure AC start electrolytic capacitor 100 has two anodes 102 and 104 wound back to back and separated by a separator 106. The formed aluminum oxide on the anodes functions as a diode, i.e. acts as an insulator in the forward bias direction and as a resistor in the reverse bias direction (bias is the direction of the applied electric field compared to the direction of the formed polarization electric field). When an AC voltage V is applied across the structure 100, at any point of the voltage waveform, one anode is a capacitor and the other a resistor (FIG. 13B). Therefore, the structure 100 behaves like a capacitor with a high power factor due to the resistance of the second anode.

Figure 14A:
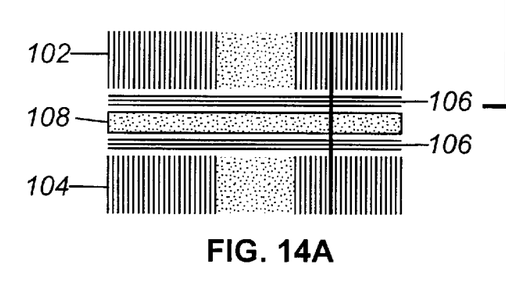
FIG. 14A is a diagrammatic view of a double anode with a floating capacitor structure for an AC start capacitor, according to an embodiment of this invention.
Figure 14B:
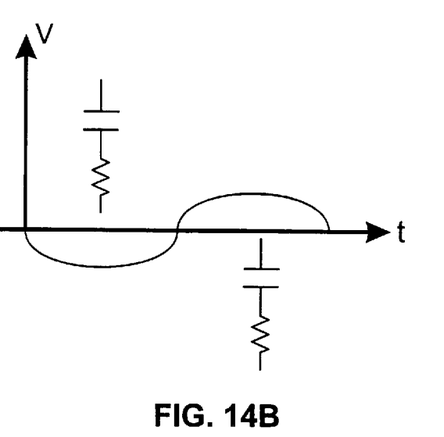
FIG. 14B is a plot of the applied AC voltage across the double anode with the floating capacitor structure of FIG. 14A.

Referring to FIG. 14A, an AC start electrolytic capacitor, according to this invention, includes in addition to the two anodes 102 and 104 a floating cathode 108 interleaved between the opposite polarized anodes. The floating cathode may be an electrolytic aluminum with aluminum oxide cathode. Separators 106 separate the anodes from the cathode. The behavior of the double anode with the floating cathode structure is the same as the double anode structure (FIG. 14B) except that the floating cathode reduces the anode formation voltage and thus the aluminum oxide thickness on the anodes. The reduced aluminum oxide thickness results in reduction of the time constant, size and cost of the AC start capacitor.

In one embodiment of this invention the floating cathode is an electrochemical cathode including a carbon coated expanded nickel mesh in contact with an electrolyte. The electrolyte may be aqueous or non-aqueous.

Replacing the floating aluminum cathode with a floating electrochemical cathode provides the same reduction in the anode formation voltage and has the additional benefit of reduced weight and size.

What is claimed is:

1. An AC start capacitor comprising
   a first electrolytic anode,
   a second electrolytic anode,
   a floating electrochemical cathode interleaved between the first and second electrolytic anodes,
   an electrolyte, and
   wherein said first and second electrolytic anodes comprise a metal and a corresponding metal oxide, said electrochemical cathode comprises a metal having top and bottom surfaces coated with a finely divided material and an AC voltage is connected to said first and second electrolytic anodes.

2. The capacitor of claim 1 wherein the electrolyte is substantially non-aqueous.

3. The capacitor of claim 1 further comprising separators separating the first and second anode from the floating cathode.

4. A capacitor of the type having a cathode and an anode and an electrolyte disposed between the cathode and the anode, the capacitor comprising
   an electrochemical cathode comprising a metal coated with a finely divided material,
   an electrolytic anode comprising an oxide forming metal and a corresponding metal oxide, and
   a substantially non-aqueous liquid electrolyte in contact with the finely divided material on the cathode and the metal oxide on the anode
   wherein the anode has a larger surface area than the cathode.

5. A capacitor of the type having a cathode and an anode and an electrolyte disposed between the cathode and the anode, the capacitor comprising
   an electrochemical cathode comprising a metal coated with a finely divided material,
   an electrolytic anode comprising an oxide forming metal and a corresponding metal oxide, and
   a substantially non-aqueous liquid electrolyte in contact with the finely divided material on the cathode and the metal oxide on the anode
   wherein the cathode comprises an expanded nickel mesh.

6. A capacitor of the type having a cathode and an anode and an electrolyte disposed between the cathode and the anode, the capacitor comprising
   a plurality of electrochemical cathodes,
   a plurality of electrolytic anodes interleaved with the electrochemical cathodes,
   a plurality of separators separating the cathodes from the anodes,
   an electrolyte disposed between the cathodes and anodes, and
   wherein the plurality of anodes and cathodes form a plurality of parallel connected capacitors
   wherein each electrochemical cathode comprises a metal having top and bottom surfaces coated with a finely divided material.

7. A capacitor of the type having a cathode and an anode and an electrolyte disposed between the cathode and the anode, the capacitor comprising
   a plurality of electrochemical cathodes,
   a plurality of electrolytic anodes interleaved with the electrochemical cathodes,
   a plurality of separators separating the cathodes from the anodes,
   an electrolyte disposed between the cathodes and anodes, and
   wherein the plurality of anodes and cathodes form a plurality of parallel connected capacitors
   wherein the anode is formed as a stack of individual metal sheets
   further comprising a collector strip connecting the individual metal sheets to each other.

* * * * *